(12) United States Patent
Hsieh et al.

(10) Patent No.: US 8,418,923 B2
(45) Date of Patent: Apr. 16, 2013

(54) NON-CONTACT READING DEVICE WITH REDUCED LOADING EFFECT

(75) Inventors: Jason Hsieh, Taipei County (TW); Chun-Wei Huang, Taipei County (TW)

(73) Assignee: Uniform Industrial Corp., Taipei County (TW)

( * ) Notice: Subject to any disclaimer, the term of this patent is extended or adjusted under 35 U.S.C. 154(b) by 206 days.

(21) Appl. No.: 13/008,561

(22) Filed: Jan. 18, 2011

(65) Prior Publication Data

US 2012/0055992 A1 Mar. 8, 2012

(30) Foreign Application Priority Data

Sep. 8, 2010 (TW) ................................ 99217406 U

(51) Int. Cl.
*G06K 19/06* (2006.01)
(52) U.S. Cl.
USPC ........................................... 235/439; 235/492
(58) Field of Classification Search .................. 235/349, 235/492, 380, 375, 382, 486, 487, 488
See application file for complete search history.

(56) References Cited

U.S. PATENT DOCUMENTS

| | | | |
|---|---|---|---|
| 2005/0092836 A1* | 5/2005 | Kudo | 235/436 |
| 2007/0273529 A1* | 11/2007 | Lee et al. | 340/572.7 |
| 2010/0156749 A1* | 6/2010 | Kim et al. | 343/866 |
| 2012/0112887 A1* | 5/2012 | Horne et al. | 340/10.1 |

* cited by examiner

*Primary Examiner* — Thien M Le
(74) *Attorney, Agent, or Firm* — Muncy, Geissler, Olds & Lowe, PLLC

(57) ABSTRACT

An non-contact reading device for reducing a loading effect connects with a host to sense a non-contact card. The non-contact reading device includes an antenna carrier board and an electromagnetic-wave absorption barrier. The antenna carrier board includes an antenna to receive a first analog signal from the non-contact card and send a second analog signal to the non-contact card. The electromagnetic-wave absorption barrier includes an electromagnetic-wave absorption material and an insulation board. The electromagnetic-wave absorption material is adapted to attach onto the antenna carrier board and absorbs the electromagnetic wave. The insulation board is attached to the electromagnetic-wave absorption material to cover on the antenna carrier board and maintain a magnetic-field interference at a fixed value.

15 Claims, 5 Drawing Sheets

NON-CONTACT READING DEVICE WITH REDUCED LOADING EFFECT

CROSS-REFERENCES TO RELATED APPLICATIONS

This non-provisional application claims priority under 35 U.S.C. §119(a) on Patent Application No. 99217406 filed in Taiwan, R.O.C. on 2010 Sep. 8, the entire contents of which are hereby incorporated by reference.

BACKGROUND OF THE INVENTION

1. Field of Invention

The present invention relates to a card reading device, in particular, to a card reading device capable of reducing loading effects.

2. Related Art

Accompanying with developments of technology, medical insurance cards, credit cards, banking cards, identification cards and passports that are frequently used in our daily life, have been developed as digital identification cards such as magnetic stripe cards or IC cards. The user's individual information is recorded in the digital identification card; for example, a non-contact ticket-paying system used in a ticket identification system. In the recent years, Radio Frequency Identification (RFID) technology has become more mature, many credit card and banking cards have been introduced to the market as a non-contact card type. The user only has to put the non-contact card on a non-contact reading device for sensing to complete a payment transaction. Therefore the transaction time is dramatically reduced; the user does not need to worry about leaving the card in the contact card reader and losing it. However, since the non-contact reading device uses electromagnetic sensing technology, it is very easy for the non-contact reading device to be interfered by the external materials surrounding the card reader. In particular, a metal housing may cause the deformation of antenna loading; an over shifted modulation of signal loading will result in operation failure when sensing a non-contact card. For instance, a non-contact reading device disposed in a parking lot might be malfunctioned due to the electromagnetic-wave reflections of its metal housing.

Since magnetic field generated from the antenna of the reading device varies according to the shapes and materials of a nearby metal, also the magnetic field will generate different Eddy current and different loading effects by a reversed electromotive force according to the Lenz's Law, the card reading will not be able to normally read the signals sent from the non-contact card. Moreover, the electromagnetic-wave absorption materials used for the reader's antenna are usually selected to match a certain metal portion on which a certain antenna design is installed, without considering various installation environments (such as the metal characteristic and shape at the installation portion). If an antenna is installed in a new housing with a different metal characteristic and shape, the antenna matching has to be adjusted. Otherwise, it is easy to cause a card-reading failure.

SUMMARY OF THE INVENTION

Accordingly, the present invention provides a non-contact reading device for reducing a loading effect, which connects with a host to sense a non-contact card. The non-contact reading device includes an antenna carrier board and an electromagnetic-wave absorption barrier. The antenna carrier board includes an antenna to receive a first analog signal from the non-contact card and send a second analog signal to the non-contact card. The electromagnetic-wave absorption barrier includes one or more electromagnetic-wave absorption material(s) and an insulation board. The electromagnetic-wave absorption material is adapted to attach onto the antenna carrier board and absorbs the electromagnetic wave. The insulation board is attached to the electromagnetic-wave absorption material to cover on the antenna carrier board and maintain a magnetic-field interference at a fixed value.

Since the electromagnetic wave will be absorbed by the electromagnetic-wave absorption material(s), and the insulation board will fix the magnetic-field interference, the loading effect that the antenna suffers would be reduced and fixed so that the effects from metal substances possibly installed around the non-contact reading device may be effectively reduced. The additional electromagnetic-wave absorption material(s) may be an adjustable factor (in shapes, sizes, characteristics and positions) corresponding to the magnetic-field changes resulted from the reversed electromotive force. The characteristic and shape of the insulation board will be fixed to maintain at an approximately fixed value so the magnetic-field interference from different installation environments may be ignored.

According to an embodiment, a method for reducing a loading effect on a non-contact reading device is also disclosed in parallel. The non-contact reading device connects with a host to sense a non-contact card and the method includes the following steps. (A) Provide an antenna carrier board. The antenna carrier board has an antenna to receive a first analog signal from the non-contact card and send a second analog signal to the non-contact card. (B) Provide one or more electromagnetic-wave absorption material. The electromagnetic-wave absorption material is attached onto the antenna carrier board to absorbing an interfering electromagnetic-wave. (C) Provide an insulation board. The insulation board is attached onto the electromagnetic-wave absorption material to cover the antenna carrier board and maintain a magnetic-field interference at a fixed value.

Preferred embodiments of the present invention and efficacies thereof will be illustrated in detail below with the accompanying drawings.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
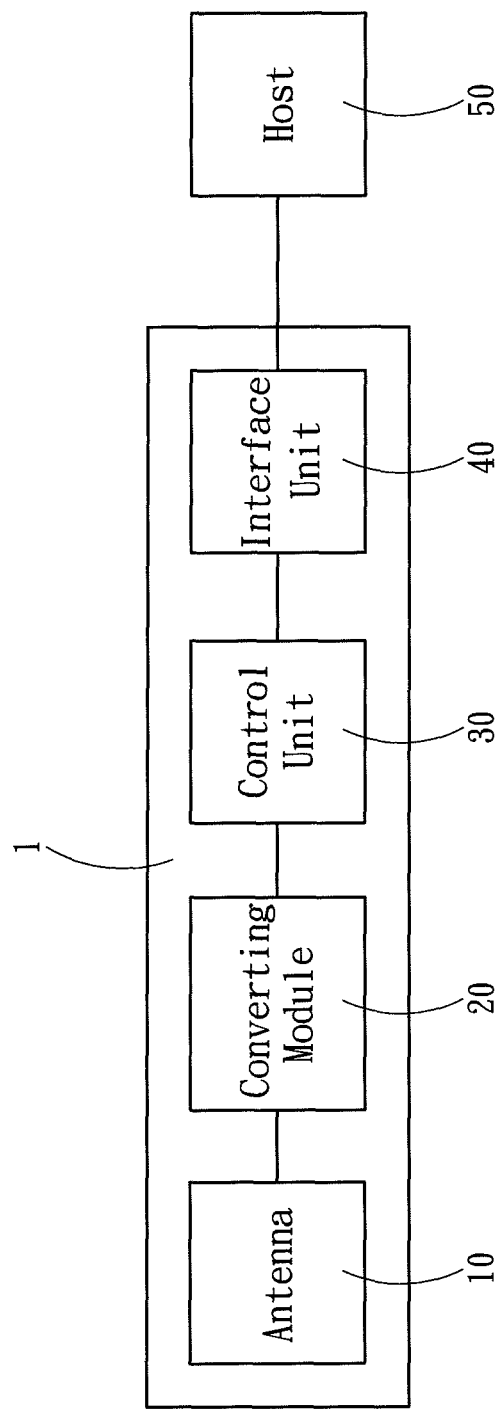
FIG. 1 is a system block diagram according to an embodiment of the present invention.

Refer to FIG. 1, which is a system block diagram according to another embodiment of the present invention. A non-contact reading device 1 is connected to a host 50; wherein the host 50 may be a ticket/identification value-storing apparatus. The user puts a non-contact card close to the non-contact reading device 1 for sensing the non-contact card. The non-contact card 1 includes a non-contact chip (not shown); wherein the non-contact chip may be a Radio Frequency Identification (RFID) chip, and the non-contact card may be selected from the group consisting of a ticket card, a cash card, a banking card and a credit card. When the current induced by the magnetic filed activates the non-contact chip, the non-contact chip sends out a first analog signal. When the antenna 10 receives the first analog signal, the non-contact reading device 1 has a converting module 20 to convert the first analog signal into a first digital signal. The non-contact reading device 1 further includes a control unit 30 and an interface unit 40. The control unit 30 receives the first digital signal and sends to the interface unit 40. The interface unit 40 is compatible with Recommend Standard 232 (RS232), Universal Serial Bus (USB), Universal Serial Bus On-The-Go (USB OTG). The interface unit 40 sends the first digital signal to the host 50.

Figure 2A:
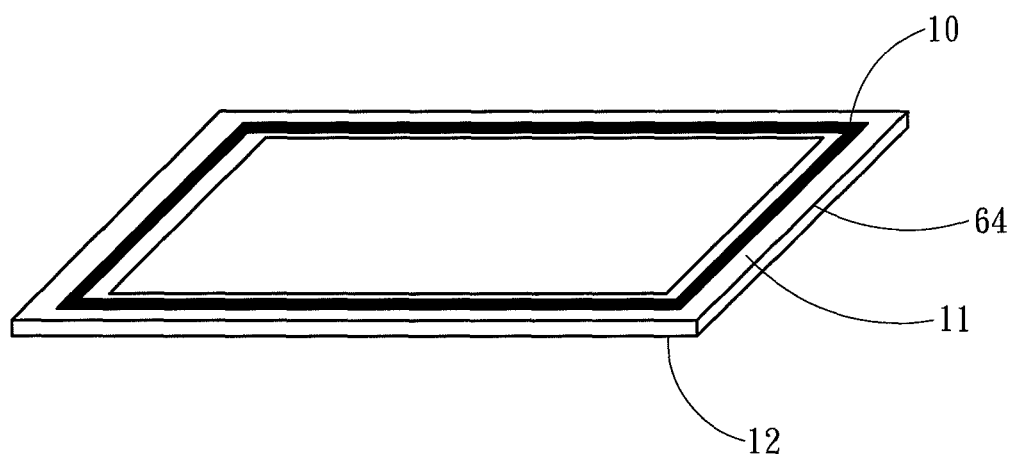
FIG. 2A is a card sensing surface of an antenna carrier board according to an embodiment of the present invention.

Refer to FIG. 2A, which is an explanatory diagram of a card sensing surface on an antenna carrier board 64. The card sensing surface 11 has an antenna 10 located thereon to receive the first analog signal from the non-contact card and send a second analog signal to the non-contact card. When the user puts the non-contact card close to the card sensing surface 11, the electromagnetic field and current excited by the antenna 10 activates the non-contact chip inside the non-contact card; the non-contact chip thereby sends the first analog signal. The antenna 10 receives the first analog signal and sends to the converting module 20. The converting module 20 converts the first analog signal into the first digital signal. The control unit 30 receives the first digital signal and sends to the interface unit 40. The interface unit 40 would send the first digital signal to the host 50 for further operation (as shown in FIG. 1).

Figure 2B:
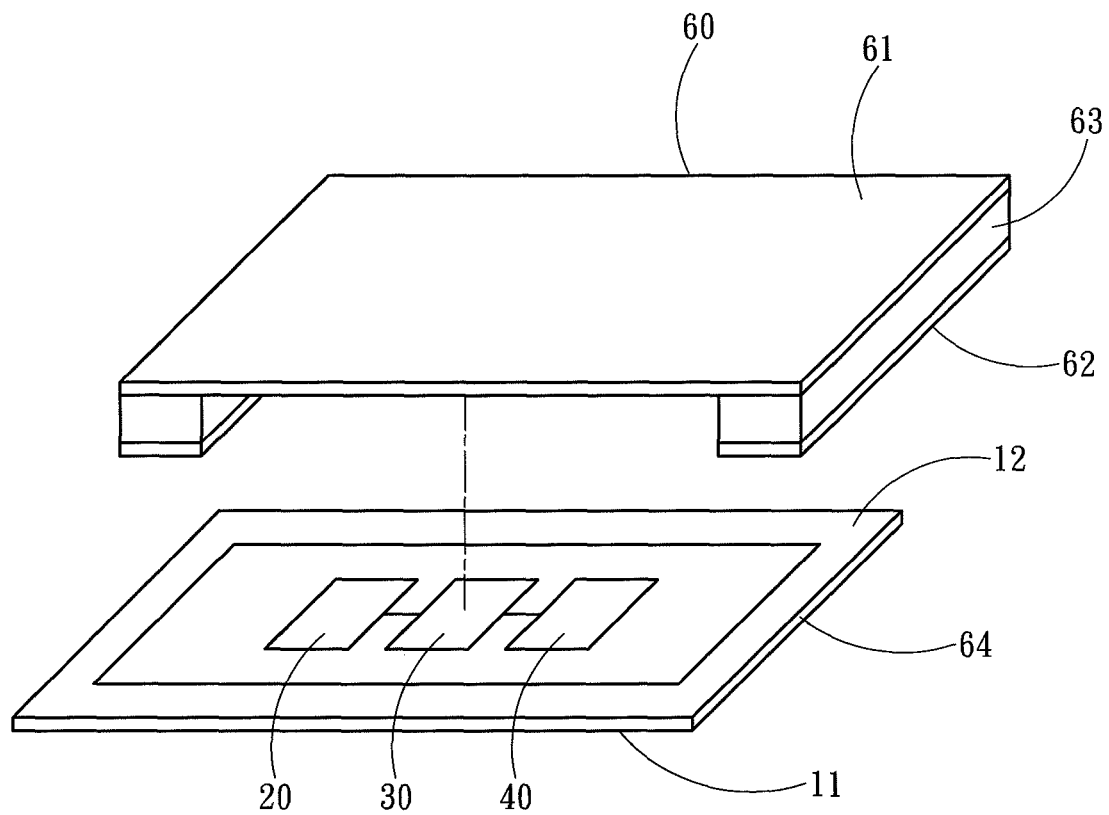
FIG. 2B is a electromagnetic-wave absorption barrier attaching to an antenna carrier board according to an embodiment of the present invention.

Please refer to FIG. 2B, which is the electromagnetic-wave absorption barrier 60. It is adapted to attach onto the antenna carrier board 64. The antenna carrier board 64 has a card sensing surface 11 and an anti-electromagnetic-wave surface 12; where the antenna 10 is located on the card sensing surface 11 (as shown in FIG. 2A). The electromagnetic-wave absorption barrier 60 includes plural (two shown in FIG. 2B) electromagnetic-wave absorption materials 62 and an insulation board 61. The electromagnetic-wave absorption materials 62 of the electromagnetic-wave absorption barrier 60 are long flat pieces adapted to attach respectively to a plurality sides (two opposite sides shown in FIG. 2B) on the anti-electromagnetic-wave surface 12 of the antenna carrier board 64. The electromagnetic-wave absorption material(s) 62 is attached on the anti-electromagnetic-wave surface 12 to be adjusted against the magnetic-field interference and maintain the magnetic-field interference at a fixed value. The insulation board 61 is attached to the electromagnetic-wave absorption material(s) 62 to cover on the anti-electromagnetic-wave surface 12 and manage the electromagnetic waves reflected from the anti-electromagnetic-wave surface 12 to the antenna 10, so that a fixed loading is maintained for the antenna 10 and block possible electromagnetic-wave interferences generated from other device(s) near the non-contact reading device 1. The antenna carrier board 64 includes a converting module 20, a control unit 30 and an interface unit 40. The electromagnetic-wave absorption barrier 60 is attached onto the other surface opposite to the card sensing surface 11 of the antenna carrier board 64. A back glue may be used to adhere with the electromagnetic-wave absorption barrier 60 and the antenna carrier board 64. The electromagnetic-wave absorption material 62 may absorb the electromagnetic-wave from the antenna 10 and reduce the electromagnetic-wave sent toward the back metal (such as the insulation board 61 or any other metal behind the insulation board 61). The electromagnetic-wave absorption material(s) 62 further attach to the insulation board 61 to prevent the electromagnetic-wave from being sent backward, and to form a certain loading (with the blocking of the insulation board 61 and the certain shape/size/characteristic/position of the insulation board 61) for the antenna 10. Therefore, the antenna's loading will not be changed due to any other metal substance/device behind the insulation board 61. In the meantime, the insulation board 61 also blocks the electromagnetic-wave interference sent from any other device from the non-contact reading device 1.

At least a portion of the insulation board 61 is made of metal to reflect the electromagnetic-wave magnetic field and maintain at the fixed value. When the antenna electromagnetic-wave contacts a metal, an interfering electromagnetic-wave will be reflected according to the Lenz's Law; such interference varies from the characteristics or shapes of different metal cases in which the non-contact reading device is installed; the receiving operation of the antenna 10 will be influenced in different levels that cause a card-reading failure. In other words, with the design of the electromagnetic-wave absorption barrier(s) 6, no matter the non-contact reading device 1 is installed in any kind of characteristics or shapes of different metal cases, the magnetic-field interference sent to the antenna 10 may reach to an approximately fixed value. Therefore, after matching the antenna 10 with the electromagnetic-wave absorption material(s) 62 for a certain magnetic-field interference, such approach can prevent reading failures due to non-matching of the antenna 10 resulted from variety of installation environments (different installation position, metal characteristics and shapes).

Figure 3A:
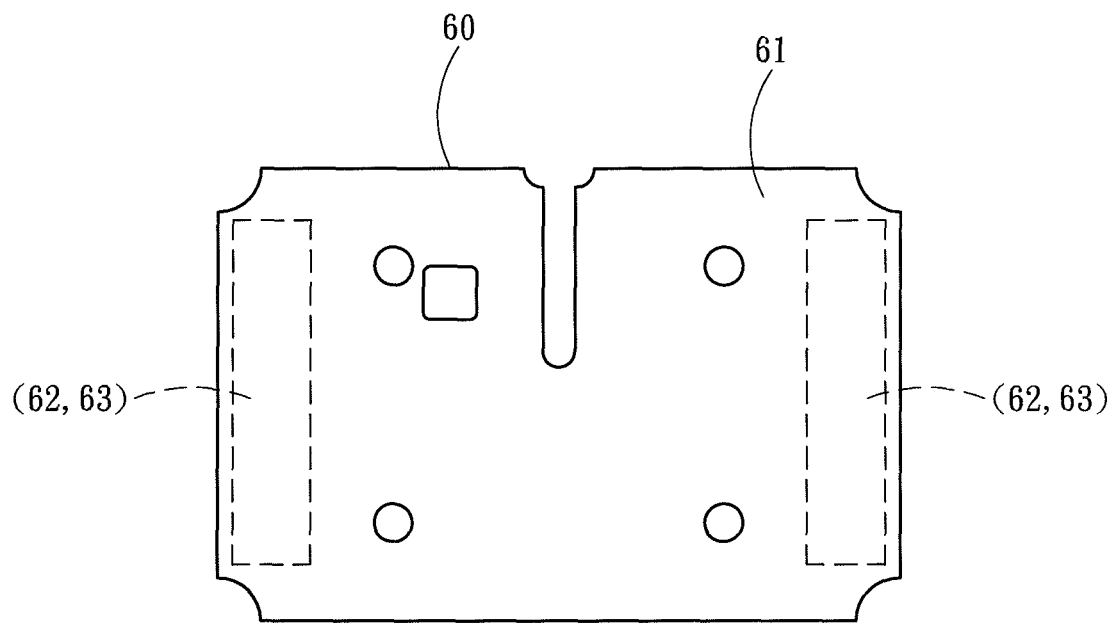
FIG. 3A is a electromagnetic-wave absorption barrier according to another embodiment of the present invention.
Figure 3B:
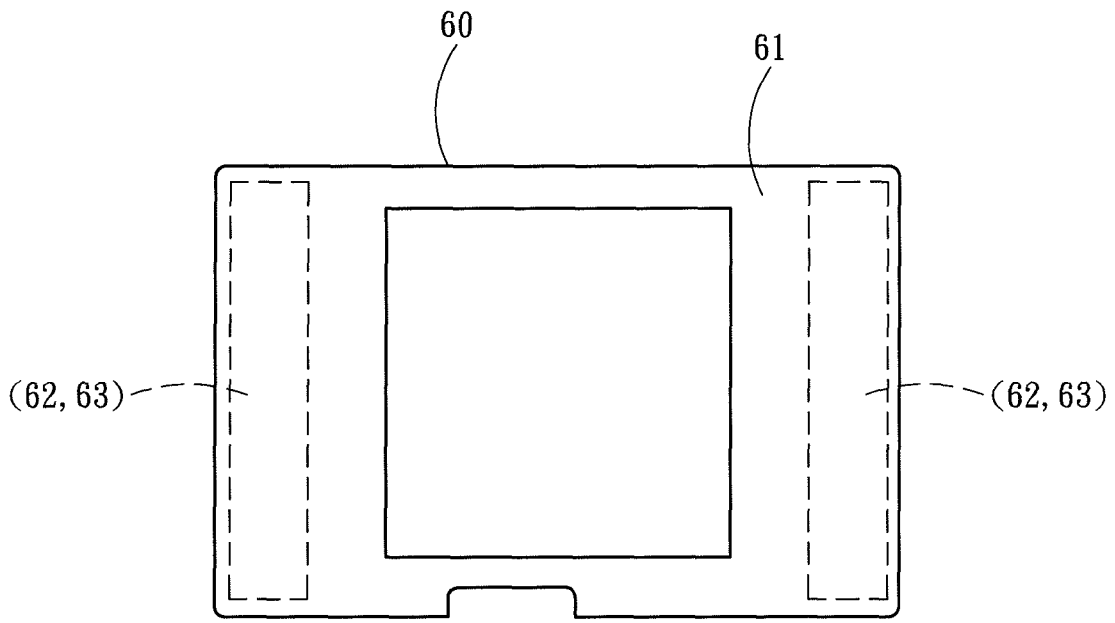
FIG. 3B is a electromagnetic-wave absorption barrier according to another embodiment of the present invention.

Please refer to FIG. 3A, which is an embodiment of the electromagnetic-wave absorption barrier 60. The electromagnetic-wave absorption barrier 60 may use a buffer material such as a foam material 63 to attach between the insulation board 61 and the electromagnetic-wave absorption material 62, and to adhere with the antenna carrier board 64 and the electromagnetic-wave absorption material 62 through a glue (as shown in FIG. 2B). Refer to FIG. 3B, which is another embodiment of the electromagnetic-wave absorption barrier 60. The insulation board 61 may include holes/slots or different corner shapes if necessary. The electromagnetic-wave absorption material 62 may be used to adjust the magnetic field interference at a fixed value even the magnetic field interference is slightly changed due to various shapes/characteristics/sizes of the insulation board 61. The foam material 63 is used to attach with both the insulation board 61 and the electromagnetic-wave absorption material(s) 62 and to adhere with the antenna carrier board 64 and the electromagnetic-wave absorption material 62 through a glue (as shown in FIG. 2B). Thus, the magnetic field will not be able to reach out of the insulation board 61, and will generate an approximately fixed value of magnetic field interference for the antenna 10. The insulation board 61 may be made of different metal materials by demand.

Figure 3C:
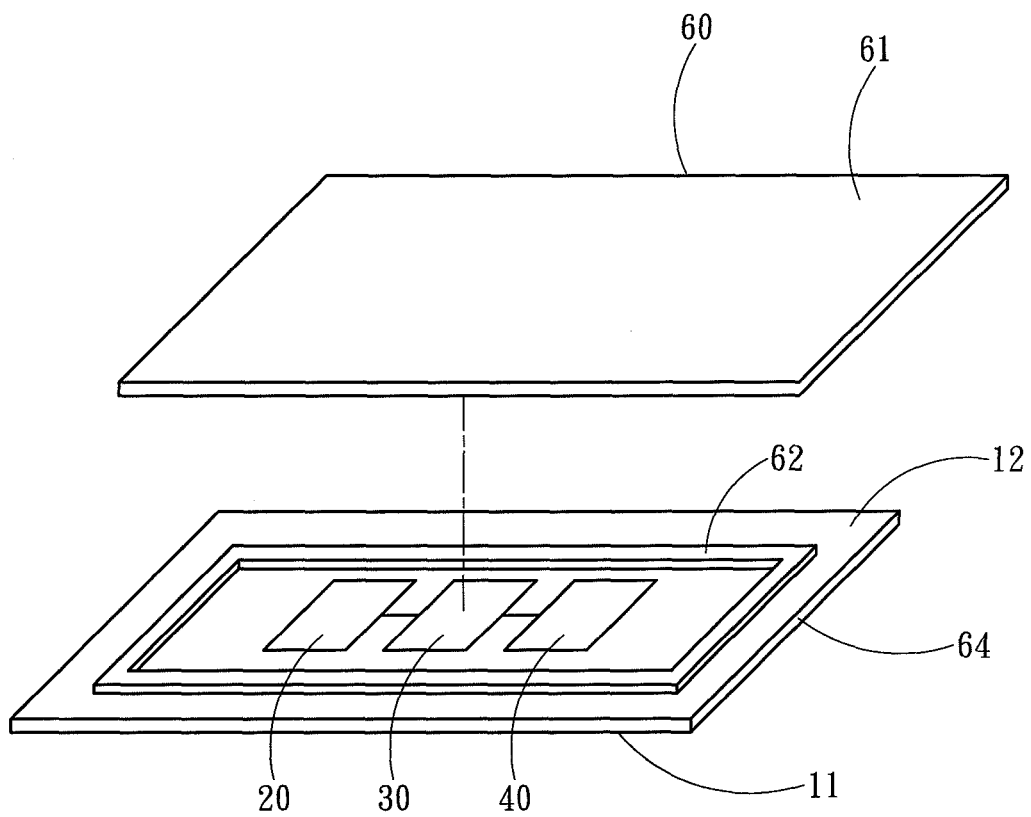
FIG. 3C is a electromagnetic-wave absorption barrier according to another embodiment of the present invention.

Please refer to FIG. 3C, which is another embodiment according to the present invention. The electromagnetic-wave absorption material 62 forms a circled shape adjacent to the sides on the anti-electromagnetic-wave surface 12 of the antenna carrier board 64. The insulation board 61 may be adhered or glued on the circled electromagnetic-wave absorption material 62, or placed above it with any other method to cover on the anti-electromagnetic-wave surface 12. The shapes and sizes of the electromagnetic-wave absorption material 62 may be designed according to the characteristics and needs of different antennas.

Figure 4:
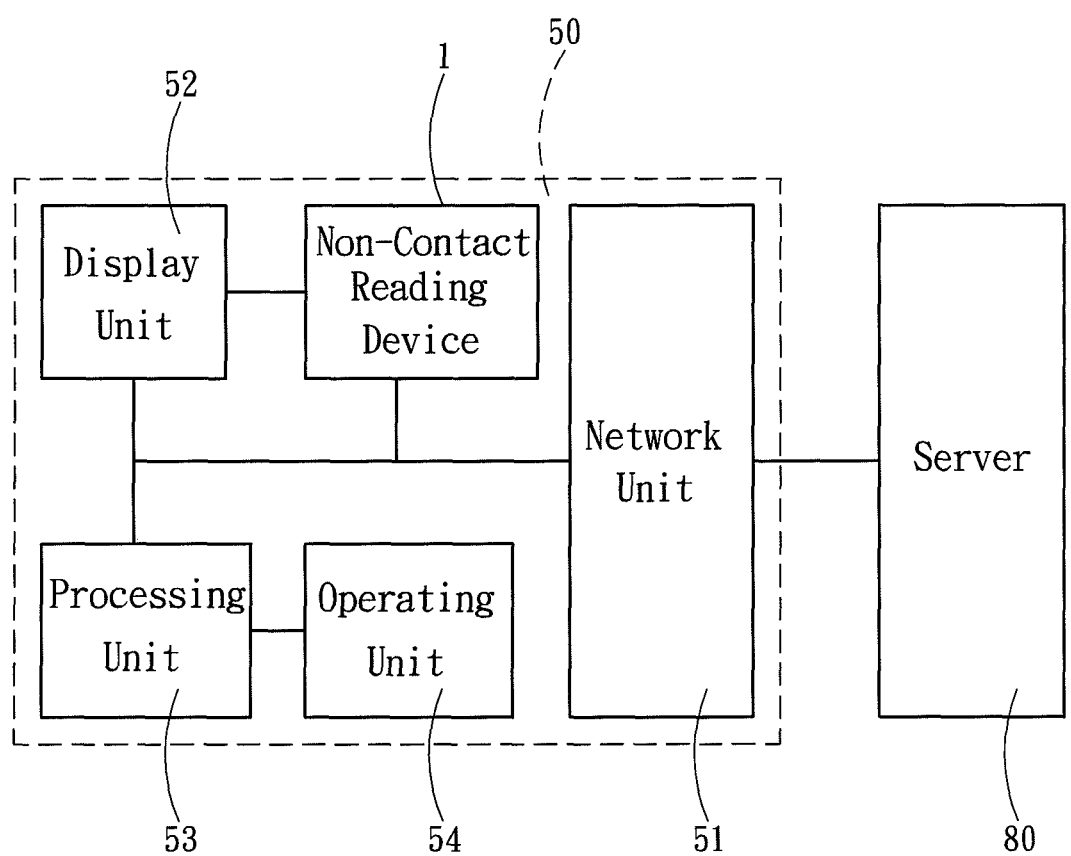
FIG. 4 is a system block diagram according to another embodiment of the present invention.

Refer to FIG. 4, which is another embodiment of the present invention. The non-contact reading device 1 is installed inside a host 50; wherein the host 50 is selected from the group consisting of a Point of Sale (POS), a home computing system, a digital TV, an internet apparatus and a personal sale terminal. The host 50 is an automatic value-stored apparatus connecting a server 80 through a network unit 51. Refer to FIG. 1 jointly, the user needs to put a non-contact card close to the non-contact reading device 1 for sensing the non-contact card. The non-contact card 1 includes a non-contact chip (not shown); wherein the non-contact chip may be a Radio Frequency Identification (RFID) chip, and the non-contact card may be selected from the group consisting of a ticket card, a cash card, a banking card and a credit card. When the current induced by the magnetic filed activates the non-contact chip, the non-contact chip sends out a first analog signal. When the antenna 10 receives the first analog signal, the non-contact reading device 1 has a converting module 20 to convert the first analog signal into a first digital signal. The non-contact reading device 1 further includes a control unit 30 and an interface unit 40. The control unit 30 receives the first digital signal and sends to the interface unit 40. The interface unit 40 is compatible with Recommend Standard 232 (RS232), Universal Serial Bus (USB), Universal Serial Bus On-The-Go (USB OTG). The interface unit 40 sends the first digital signal to the host 50. Furthermore, the host 50 includes an operating unit 54 for the user to input any transaction data; after identified by the processing unit 53, the services provided on the host 50 may be further served. When the host 50 needs to write a second digital signal with certain information for the non-contact card, the processing unit 53 sends the second digital signal to the non-contact reading device 1 for further processing and sending to the non-contact chip of the non-contact card. For example, if the user need to add value to the non-contact card, through the value-adding service of the host 50, the processing unit 53 of the host 50 will return with a second digital signal to the non-contact reading device 1 (through the interface unit 40, the control unit 30 to the converting module 20). The converting module 20 will convert the second digital signal into a second analog signal, and send to write in the non-contact chip of the non-contact card through the antenna 10.

In the embodiments above, the electromagnetic-wave absorption material(s) 62 is attached to the foam material 63 first and to the insulation board 61; and the whole electromagnetic-wave absorption barrier 60 is adhered to the antenna carrier board 64. Through design, the loading effects excited by the metal interferences surrounding the antenna 10 should be effectively reduced and, in the meantime, blocking the electromagnetic-wave interference sent/reflected from any possible devices behind/near the non-contact reading device. The electromagnetic-wave absorption material(s) 62 further reduces any interference to a minimum level so that the non-contact reading device 1 will not have reading failures no matter the non-contact reading device 1 is installed in any kind of metal housing.

According to the embodiments disclosed above, a method for reducing a loading effect on a non-contact reading device is also disclosed in parallel. The non-contact reading device connects with a host to sense a non-contact card and the method includes the following steps.

(A) Provide an antenna carrier board. The antenna carrier board has an antenna to receive a first analog signal from the non-contact card and send a second analog signal to the non-contact card.

(B) Provide one or more electromagnetic-wave absorption material. The electromagnetic-wave absorption material is attached onto the antenna carrier board to absorbing an interfering electromagnetic-wave.

(C) Provide an insulation board. The insulation board is attached onto the electromagnetic-wave absorption material to cover the antenna carrier board and maintain an magnetic-field interference at a fixed value.

A practical way for engineers to maintain the magnetic-field interference at a fixed value in a different installation environment without any changes on the insulation board is to adjust the shape, size, position, characteristics and thickness (adjustable items) of the electromagnetic-wave absorption material. Therefore, the method above may further include a step of:

(D) Selectively adjusting the electromagnetic-wave absorption material to maintain the magnetic-field interference at a fixed value in a different installation environment for the non-contact reading device.

While the present invention has been described by the way of example and in terms of the preferred embodiments, it is to be understood that the invention need not to be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A non-contact reading device for reducing a loading effect, connecting with a host to sense a non-contact card, comprising:
    an antenna carrier board, having an antenna to receive a first analog signal from the non- contact card and send a second analog signal to the non-contact card; and
    an electromagnetic-wave absorption barrier, comprising:
    at least one electromagnetic-wave absorption material, attached onto the antenna carrier board to absorb an interfering electromagnetic-wave; and
    an insulation board, attached onto the electromagnetic-wave absorption material to cover the antenna carrier board and maintain an magnetic-field interference at a fixed value;
    wherein the electromagnetic-wave absorption material forms a circled shape adjacent to the sides on the anti-electromagnetic-wave surface of the antenna carrier board.

2. The non-contact reading device of claim 1, wherein the non-contact card comprises a non-contact chip.

3. The non-contact reading device of claim 2, wherein the non-contact chip is a Radio Frequency Identification (RFID) chip.

4. The non-contact reading device of claim 1, wherein the non-contact card is selected from the group consisting of a ticket card, a cash card, a banking card and a credit card.

5. The non-contact reading device of claim 1, wherein the antenna carrier board further comprises a card sensing surface with the antenna located thereon.

6. The non-contact reading device of claim 5, wherein the electromagnetic-wave absorption barrier is attached onto an anti-electromagnetic-wave surface opposite to the card sensing surface of the antenna carrier board.

7. The non-contact reading device of claim 1, wherein at least one portion of the insulation board is made of metal.

8. The non-contact reading device of claim 1, wherein at least one foam material is attached between the insulation board and the electromagnetic-wave absorption material.

9. A method of reducing a loading effect on a non-contact reading device, the non-contact reading device connecting with a host to sense a non-contact card, the method comprising the steps of:

providing an antenna carrier board, which having an antenna to receive a first analog signal from the non-contact card and send a second analog signal to the non-contact card;

providing at least one electromagnetic-wave absorption material, which being attached onto the antenna carrier board to absorb an interfering electromagnetic-wave; and providing an insulation board, which being attached onto the electromagnetic-wave absorption material to cover the antenna carrier board and maintain an magnetic-field interference at a fixed value;

wherein the electromagnetic-wave absorption barrier is attached onto an anti-electromagnetic-wave surface opposite to the card sensing surface of the antenna carrier board, and the electromagnetic-wave absorption material forms a circled shape adjacent to the sides on the anti-electromagnetic-wave surface of the antenna carrier board.

10. The method according to claim 9 further comprising a step of:

selectively adjusting the electromagnetic-wave absorption material to maintain the magnetic-field interference at a fixed value in a different installation environment for the non-contact reading device.

11. The method according to claim 10, wherein an adjustable item of the electromagnetic-wave absorption material is selected from shape, position, characteristics, size and thickness.

12. The method according to claim 9, wherein the antenna carrier board further comprises a card sensing surface with the antenna located thereon.

13. The method according to claim 9, wherein at least one portion of the insulation board is made of metal.

14. A non-contact reading device for reducing a loading effect, connecting with a host to sense a non-contact card, comprising:

an antenna carrier board, having an antenna to receive a first analog signal from the non-contact card and send a second analog signal to the non-contact card; and an electromagnetic-wave absorption barrier, comprising:

at least one electromagnetic-wave absorption material, attached onto the antenna carrier board to absorb an interfering electromagnetic-wave; and an insulation board, attached onto the electromagnetic-wave absorption material to cover the antenna carrier board and maintain an magnetic-field interference at a fixed value;

wherein a plurality of the electromagnetic-wave absorption materials of the electromagnetic-wave absorption barrier are long flat pieces attached respectively to a plurality of sides on the anti-electromagnetic-wave surface of the antenna carrier board.

15. A method of reducing a loading effect on a non-contact reading device, the non-contact reading device connecting with a host to sense a non-contact card, the method comprising the steps of:

providing an antenna carrier board, which having an antenna to receive a first analog signal from the non-contact card and send a second analog signal to the non-contact card;

providing at least one electromagnetic-wave absorption material, which being attached onto the antenna carrier board to absorb an interfering electromagnetic-wave; and providing an insulation board, which being attached onto the electromagnetic-wave absorption material to cover the antenna carrier board and maintain an magnetic-field interference at a fixed value;

wherein the electromagnetic-wave absorption barrier is attached onto an anti-electromagnetic-wave surface opposite to the card sensing surface of the antenna carrier board, and a plurality of the electromagnetic-wave absorption materials of the electromagnetic-wave absorption barrier are long flat pieces attached respectively to a plurality of sides on the anti-electromagnetic-wave surface of the antenna carrier board.

* * * * *